United States Patent [19]

Sanders

[11] 3,997,733
[45] Dec. 14, 1976

[54] INTRINSICALLY SAFE COMMUNICATION SYSTEMS

[75] Inventor: David Albert Sanders, Houston, Tex.
[73] Assignee: Browne-Davies Electronic Corporation, Houston, Tex.
[22] Filed: May 1, 1975
[21] Appl. No.: 573,626
[52] U.S. Cl. .............................. 179/81 R; 317/16
[51] Int. Cl.² ................... H04M 1/00; H02H 3/20
[58] Field of Search ........ 317/33 R, 33 VR, 33 SC, 317/16; 179/81 R, 4

[56] References Cited
UNITED STATES PATENTS

| | | | |
|---|---|---|---|
| 2,285,022 | 6/1942 | Edwards | 179/81 R |
| 3,181,033 | 4/1965 | Bakker | 179/81 R |
| 3,558,830 | 1/1971 | Bender | 179/81 R |
| 3,624,449 | 11/1971 | Morgan | 317/16 |
| 3,631,264 | 12/1971 | Morgan | 317/16 |
| 3,813,578 | 5/1974 | Tiffany | 317/16 |

Primary Examiner—Thomas A. Robinson
Attorney, Agent, or Firm—Arthur M. Dula; Murray Robinson; Ned L. Conley

[57] ABSTRACT

The invention is a communications and tone control system for use between safe and hazardous areas. The invention's field terminals operate in hazardous areas and are limited to low, intrinsically safe power levels by the use of zener barriers and current limiting resistors. The limited D.C. electrical power supplied to the field terminal's amplifier is modulated by field initiated communication and control signals. The resulting duplex transmission allows a strong information carrying signal and amplifier power to pass through a single twisted pair at intrinsically safe power levels. All field stations are connected in parallel to a central control system in a safe area allowing the communication system to operate redundantly. The field stations can be selectably connected to a plurality of output devices by tone controlled switching circuits.

6 Claims, 5 Drawing Figures

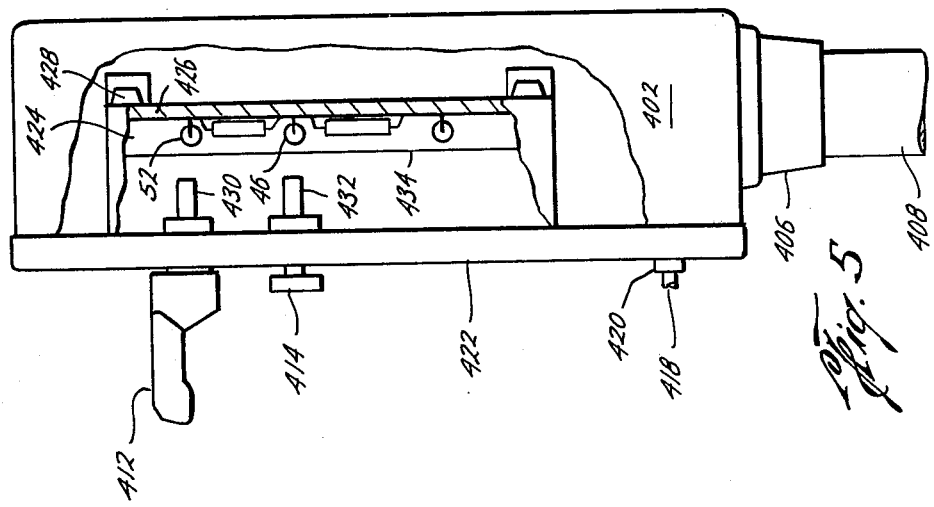
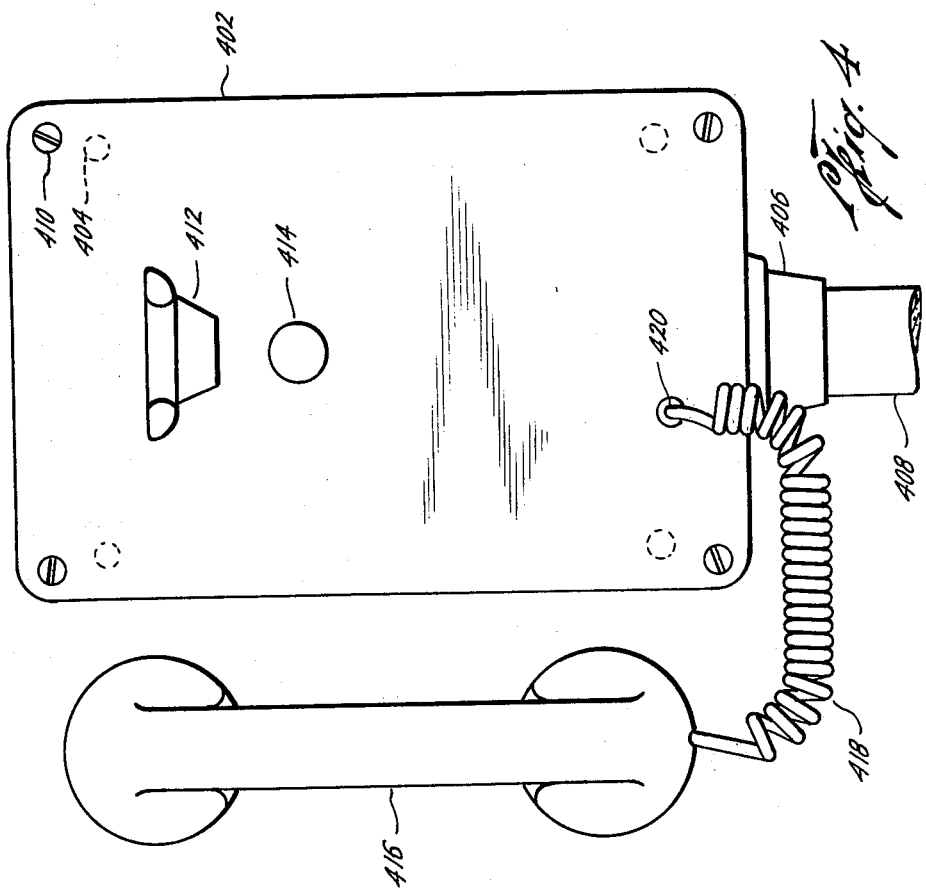

INTRINSICALLY SAFE COMMUNICATION SYSTEMS

BACKGROUND OF THE INVENTION

1. Field of the Invention

The invention relates generally to voice communication and tone control systems, and more specifically relates to such systems for intra-or interplant use that operate between hazardous and safe areas. The present invention further relates to control and annunciator systems designed to operate at power levels low enough to render the system intrinsically safe and reliable enough to maintain this intrinisically safe operation even if the system malufunctions.

2. Description of the Prior Art

Communication and control systems utilizing electrical energy can cause severe explosions or fire in a hazardous atmosphere. To prevent this the standard practice is to house all active components of communciation and control systems and THE SYSTEMS interconnecting wiring in heavy, hermetically sealed housing and conduits. Any local explosion caused by the electrical equipment would then be confined within the explosion proof housing and could not cause a general explosion.

It is also possible to prevent explosions by purging the hazardous area with an inert gas, ventilation, or burning a continuous pilot. All of these systems assure safe operation by preventing the uncontrolled accumulation of a large volume of hazardous gas, thus preventing an explosion that could damage life or property.

Another method of ensuring safe operation is to limit the amount of power in the hazardous area. Signal, instrument control and annuciator systems have been designed to operate at such low power levels that electrical equipment in the hazardous area becomes intrinsically safe. By definition, an intrinsically safe system cannot release enough energy under either normal or failure conditions to cause ignition of the hazardous atmospheric mixture in its most easily ignitable concentration. The English, who pioneered in the field of energy limited circuits, report that intrinsically safe systems can be constructed either by providing energy limiting circuits for each instrument having connections to the hazardous area or by adding energy limiting devices, called barriers, in each signal or power line going to or from a hazardous area. The history of such intrinsically safe equipment is detailed in a publication entitled "The Barrier Approach to Intrinsic Safety" available as Taylor Technical Data Sheet No. TDS-20A100 from the Taylor Instrument Company, Rochester, New York.

All microphones used in telephonic communication systems operate by either generating or modulating an electrical signal. The accustical energy in the human voice must be capable of moving a mechanical part, usually a diaphragm. The moving diaphragm then controls the flow or production of electrical energy. Diaphragms flexible enough to be moved by the human voice must be thin. A thin diaphragm cannot meet the safety standards required for safe operation in hazardous areas. Thus the power levels present in the microphones of a telephone system operating in a hazardous area must be low enough to be intrinsically safe.

The carbon microphones used in ordinary telephones operate by imposing a relatively high (unsafe) voltage across a pad of carbon that is compressed and released by the movement of a thin diaphragm. As the carbon is compressed it presents a varying resistance to the flow of current, thus modulating it. If the diaphragm is punctured or the connecting cable cut, an unsafe level of electrical power will be exposed to the hazardous area's atmosphere. Because of this, carbon microphones cannot be used in hazardous areas without explosion proof protections.

Ddynamic microphones generate a very low level of electrical energy by moving a coil of wire attached to the flexible diaphragm near a magnet. This voltage output is low enough to be intrinsically safe and dynamic microphones may safely be used in hazardous areas. Unfortunately, the low voltage produced by a dynamic microphone must be amplified before it can be used in a telephone system. Because of line losses and noise, the amplifier must be located as near as possible to the microphone. Thus all telephone systems operating in hazardous areas consist of a dynamic microphone in a handset and a field amplifier mounted near the handset (for example, the system taught by U.S. Pat. No. 3,080,454). This amplifier requires a high power input (in the case of the cited reference, a 110 volt AC supply) to produce an amplified signal output strong enough to be transmitted to and through the rest of the system. Because of its high (unsafe) power requirements, the field amplifier must be housed in an explosion proof housing having covers affixed by multiple bolts, and the power and signal wiring must be enclosed in sealed conduits. These heavy and expensive provisions designed to insure explosion proof operation could still fail if a cover bolt was improperly tightened or a scratch made in the ground (i.e. fitted) surface of a cover plate during maintenance. Additionally, the connection between the intrinsically safe handset and the amplifier in an explosion proof housing could only be made through a special sealing connector.

These complex, heavy, expensive and failure prone "explosion proof" housings and cabinets were necessary because the field amplifier required high power levels to amplify weak signals from the dynamic microphone and to drive these amplified signals back to a central station or around a series circuit party line.

The prior art, in addition to disclosing high power levels in the field, usually taught operation of the individual field handsets in a series circuit or "party line." Party line operation lessened the expense and possibility of failure associated with running a plurality of parallel circuits through explosion proof conduits. Failure of any part of a party line circuit (i.e. via explosion) puts the entire communications system or some substantial part of it out of operation. In an emergency, power could not be maintained to any part of a series circuit system because this would create a possibility of causing further explosions. Examples of the present state of the art, as described above, together with types of explosion proof housings currently required for safe operation may be found in the 1974 Browne-Davies Electronics Corporation Catalog available from the company at 10600 Fallstone Rd., Houston, Tx.

SUMMARY OF THE INVENTION

The invention is a method of and apparatus for intrinsically safe telephonic and tone control communication between safe and hazardous areas.

The method teaches the multiplex transmission of telephonic, tone control and power signals over a single twisted pair. The total energy of the multiplexed signal in the hazardous area is limited by the use of zener barriers and current limiting resistors. The field terminals of the system operate redundantly in parallel circuit with a central station located in a safe area.

The apparatus used to practice the invention may be designed in any convenient manner to accomplish the method.

In the preferred embodiment, a dynamic microphone and control tone generator are inputs to a local amplifier located at each field terminal. The amplifier is equipped with current limiting resistors and modulates its D.C. supply voltage to carry the communication signal through a single twisted pair of wire to a zener barrier strip. Zener barriers operate to limit the voltage that can appear on the twisted pair. The zener barriers pass the signal to an isolation transformer on a control card where power and communications signals are separated. The communication signal is then processed for interaction with a selectable plurality of outputs, and the tone control signal is processed to perform its control function.

The entire portion of the system operating in the hazardous area may be housed in light plastic or fiberglass cases and the twisted pairs interconnecting the system may be laid in open cable trays.

BRIEF DESCRIPTION OF THE DRAWINGS

FIG. 4 is a plain relief view of the exterior housing of a field terminal taught by the preferred embodiment of the present invention; and FIG. 5 is a side view of the field terminal shown in FIG. 4 partially cut away to show the field amplifier.

DESCRIPTION OF THE PREFERRED EMBODIMENT

Figure 1:
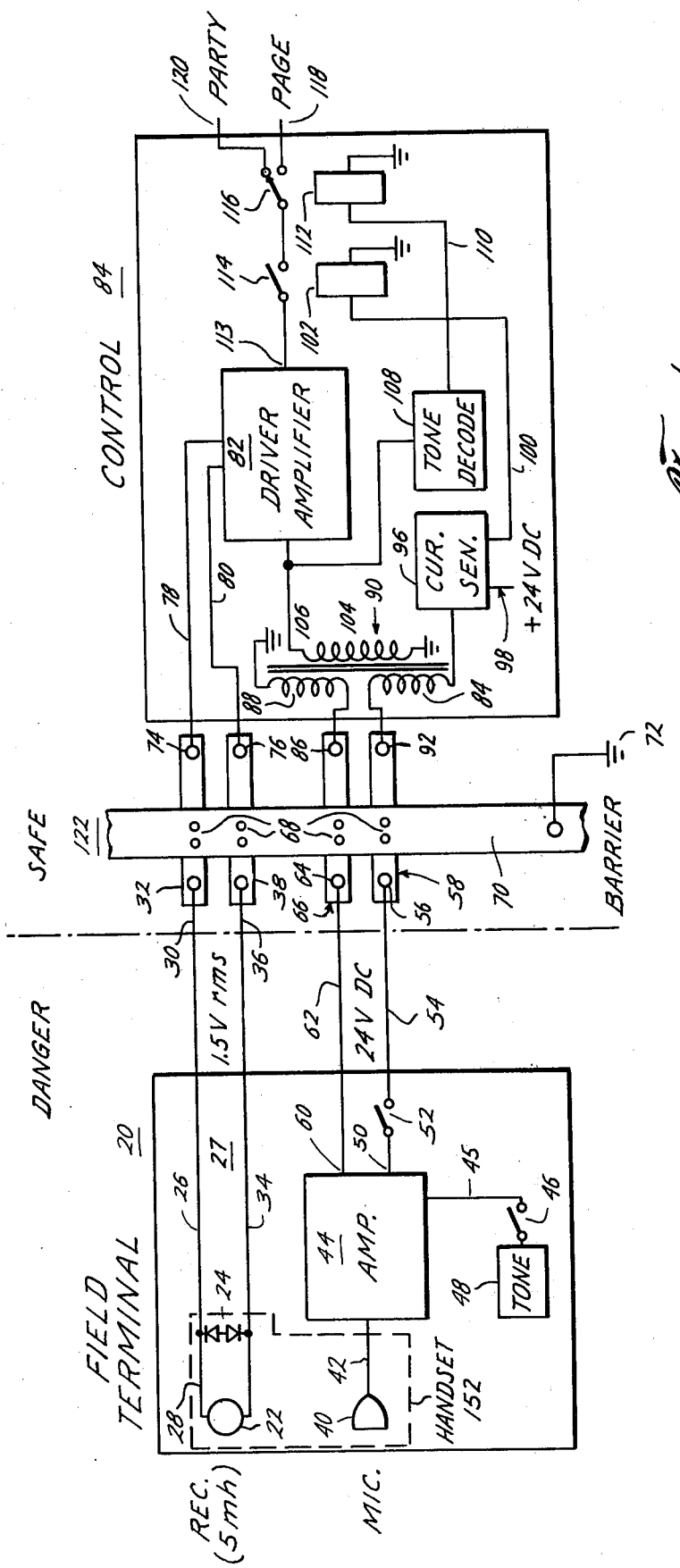
FIG. 1 is a schematic block diagram showing the main elements of one channel of an intrinsically safe telephone system constructed according to preferred embodiment of the present invention.

FIG. 1 is a schematic block biagram showing the main elements of one channel of an intrinsically safe telephone system constructed according to the preferred embodiment of the present invention.

Field terminal 20 contains a telephone receiver 22 connected in parallel with a varistor 24, and this varistor may be replaced by redundant 3-volt zener diodes if desired. Conductor 26 of twisted pair 27 is connected at its handset end 28 to one side of said parallel circuit and at its barrier end 30 to the output terminal of a zener barrier 32. Conductor 34 of said twisted pair is connected at its handset end to the other side of the parallel circuit formed by receiver 22 and varistor 24. Barrier end 36 of conductor 34 is connected to the output terminal of zener barrier 38.

Handset 20 contains a dynamic microphone 40, which may be equipped with a noise cancelling mouthpiece. Microphone 40 is electrically connected by twisted pair 42 to handset amplifier 44. A tone generator 48 is electrically connected through switch 46 and line 45 to handset amplifier 44. The positive power input terminal 50 of amplifier 44 is electrically connected through a hook switch 52 and conductor 54 to output terminal 56 of zener barrier 58. The negative power input terminal 60 of amplifier 44 is similarly connected by conductor 62 to output terminal 64 of zener barrier 66.

Zener barriers 32, 38, 58 and 66 are securely electrically grounded by connections 68, which also serve as mechanical supports, to a conductive grounding strip 70. Metal grounding strip 70 is then electrically connected to a ground 72. The elements of the preferred embodiment of the invention described above may be operated in a dangerous, or hazardous environment in perfect safety for reasons that will be explained in the functional description of the invention.

Input terminals 74 and 76 of zener barriers 32 and 38 are electrically connected by conductors 78 and 80, respectively, to the output of driver amplifier 82 on control card 84. Input terminal 86 of zener barrier 66 is connected through a portion of the primary winding 88 of isolation transformer 90 to ground. Input terminal 92 of zener barrier 58 is connected electrically through primary winding 84 of transformer 90 and current sensor 96 to a source of D.C. power of 98 (in the preferred embodiment, 24 volts). Current sensor 96 is connected via conductor 100 to the coil of driver amplifier output relay 102.

One side of the secondary winding 104 of isolation transformer 90 is connected to ground, and the other side of said winding 106 is connected to the inputs of driver amplifier 82 and tone decoder 108. Tone decoder 108 is connected by conductor 110 to the coil of output selector relay 112. The output terminal 113 of driver amplifier 82 is connected in series circuit through switching section 114 of relay 102 to switching section 116 of relay 112. The output of selector portion 116 of relay 112 is selectably connected to either line 118 or line 120.

Functionally, FIG. 1 depicts one channel of an intrinsically safe telephonic communication and tone control system constructed according to the preferred embodiment of the present invention. Control card 84 operates to electrically connect a field handset to a party line telephone system through terminal 120 or, alternatively, to a paging system through terminal 118.

The control card is connected to a source of 24 volt D.C. power through input terminal 98. When hookswitch 52 is closed by the act of an operator in the field picking up the telephone handset, then current sensor 96 senses the flow of current from terminal 98 to and through primary windings 84 and 88 of isolation transformer 90. The electric current flows through primary winding 84 of the transformer 90 and then through zener barrier 58 and hookswitch 52 to positive power input terminal 50 of amplifier 44. Returning from the negative power input terminal 60 of amplifier 44 the current flows through zener barrier 66 and primary winding 88 to ground. Amplifier 44 accepts modulating signals from microphone 40 and tone generator 48.

When switch 46 is closed, tone generator 48 produces a tone of known frequency. Through amplifier 44, this tone signal modulates the D.C. power signal. Likewise, sound waves striking dynamic microphone 40 causes it to generate an A.C. electrical signal that is carried by twisted pair 42 to amplifier 44; amplifier 44 operates to cause the voice signal to modulate the power signal passing through the amplifier. Thus, conductors 54 and 62 simultaneously carry 24 volt D.C. power to amplifier 44 and the amplifier's modulated output signal, i.e. the information provided by inputs from tone generator 48 and microphone 40.

Conductors 54 and 62 are separated from the control circuitry card by zener barriers 58 and 66, respectively. A zener barrier provides a means of limiting the voltage that can appear across the output of the barrier regardless of the voltage applied to its input. Thus, they also limit the voltage on the twisted pair and at amplifier 44. Basically the zener barrier is one or more zener diodes having a known voltage rating connected between the power conveying line and ground. As long as the voltage between the line and ground is below the diode's rated voltage, the diode presents a very high resistance to the line and no appreciable amount of power flows thrugh the zener diode to ground. If a voltage higher than the zener voltage is applied across the input terminals 86 and 92 of barriers 66 and 58, then the zener diodes connected between the power conveying line and ground connections 68 go into zener breakdown (also known as "avalanche breakdown") and their resistance to the flow of current drastically declines. Following the path of least resistance the excess voltage is shunted through the zener diode and grounding attachment points 68 to grounding strip 70 and ground. The current flow through amplifier 44 is limited by wire wound resistors that "fail safe" as will be described later.

When an operator speaks into microphone 40 and causes amplifier 44 to modulate the power signal passing through zener barriers 58 and 66, an A.C. signal results across primary windings 84 and 88 of isolation transformer 90. This A.C. signal induces an A.C. voltage in secondary winding 104 of transformer 90, the D.C. power component in the primary winding being isolated. This A.C. signal, which is the voice and tone modulated information signal, is then amplified by driver amplifier 82 and presented as an amplified output at terminal 113.

When hookswitch 52 is closed (by the act of picking up the handset), current sensor 96 senses the flow of current through amplifier 44's power circuit and provides sufficient power to line 100 to energize the coil of relay 102. Energizing this coil causes relay contacts 114 to close and connects output 113 of driver amplifier 82 to either a telephone circuit or a paging system, depending on the position of relay contacts 116.

When page switch 46 is closed by the operator of the handset in the field, tone generator 48 produces a tone that modulates the power signal of amplifier 44 as described above. This modulated power signal induces and A.C. voltage in winding 104 of isolation transformer 90, which is directly connected to the input of tone decoder 108. Tone decoder 108, upon detecting the presence of the specific known frequency tone generated by tone generator 48, switches sufficient power to line 110 to energize the coil of relay 112.

In the operation of the preferred embodiment of the invention, when relay 112 is unenergized, relay contacts 116 connect the output of driver amplifier 82 to a standard telephone circuit as represented by terminal 120. When page switch 46 is closed and tone generator 48 modulates the power signal passing through amplifier 44, then tone decoder 48 energizes the coil of relay 112 and causes relay contacts 116 of relay 112 to connect the output of driver amplifier 82 to a paging or public address system 118.

The present invention provides communication to, as well as from the field operator. When an incoming signal from telephone line 120 is connected to driver amplifier 82, driver amplifier 82 amplifies the signal and presents it as an A.C. potential of approximately 1.5 volts RMS through conductors 80 and 78 to the input terminals 76 and 74 of zener barriers 38 and 32, respectively. These zener barriers operate exactly like the zener barriers between amplifier 44 and transformer 90, i.e. they act to limit the voltage that can appear across the output of the barrier strips. In the preferred embodiment, zener barriers 38 and 32 would be rated at 10 volts and any higher voltage that was accidentally or deliberately placed across input terminal 76 or 74 would be shunted through the zener diodes to ground connection 68 and thence to grounding strip 70 and ground.

The output terminals of zener barriers 38 and 32 are connected to twisted pair 27 at one end of conductors 26 and 34, respectively. This twisted pair runs from the barrier strip to the telephone handset containing amplifier 44, which is in the field. Conductor 34 of the twisted pair is connected to one side of a parallel circuit composed of a varistor (voltage variable resistor) 24 and a telephone receiver 22. The other conductor 26 is connected to the other side of said parallel circuit. Varistor 24 has a voltage current characteristic such that it presents a high resistance to low voltage and a low resistance to high voltage. It thus operates to shunt relatively high voltage noise signals around telephone receiver 22, helping to assure noise free reception of the voice signal provided by driver amplifier 82 at receiver 22. If desired, varistor 24 may be replaced by redundant back-to-back 3-volt zener diodes to accomplish the additional result of providing a barrier in the field terminal.

Each channel of an intrinsically safe telephonic communication system constructed according to the preferred embodiment of the present invention is divided into three main parts. First a control card 84 is located in a safe environment (one where high power levels can be tolerated). This control card is electrically connected to four zener barriers. The zener barriers are also located in the safe environment. Two of these barriers carry D.C. power to a microphone and tone amplifier 44 in the handset. This D.C. power circuit is modulated by amplifier 44 when said amplifier receives modulation signals from the handset microphones 40 and/or one or more tone generators 48. The twisted pair of wires and zener barriers associated with the D.C. power circuit thus carry both the power itself and an A.C. communications signal that is impressed by the amplifier on the power signal. The other two zener barriers are connected between the driver output amplifier on control card 84 and handset receiver 22. The zener barriers operate to limit the voltage that can appear across their outlet terminals regardless of the voltage placed across their input terminals. This is accomplished by connecting a zener diode between the power carrying line and ground. The electrical characteristics of the zener diode are chosen so it presents a very high resistance up to a certain known voltage. When this voltage is exceeded the resistance of the zener diode becomes very low and the diode effectively shunts the excess voltage to ground. In actual operation, two zener diodes are used for reliability and each power carrying line passes through a separate zener barrier. This design insures that the output of the zener barrier connected to the handset will always be below a known voltage regardless of the voltage or power that is applied across its input in the safe environment.

The output from the zener barriers is carried by two twisted pairs of wire (four wires) to the third part of the communication system. This third part is a handset 20 and it operates in a dangerous environment (one where power levels must be kept very low for the handset to be intrinsically safe). The handset contains a receiver connected in parallel with a varistor and one of the twisted pairs. The handset also contains a microphone 40 and one or more tone generators 48 that are electrically connected to an amplifier 44 that amplifies the signals and uses them to modulate the D.C. power flow through the other twisted pair. The amplifier is provided with current limiting resistors to insure that only a limited amount of current can flow up to the voltage that will cause the zener barrier strips to ground out the power supply. This limits the total power that can appear at any point in the hazardous area.

Figure 2:
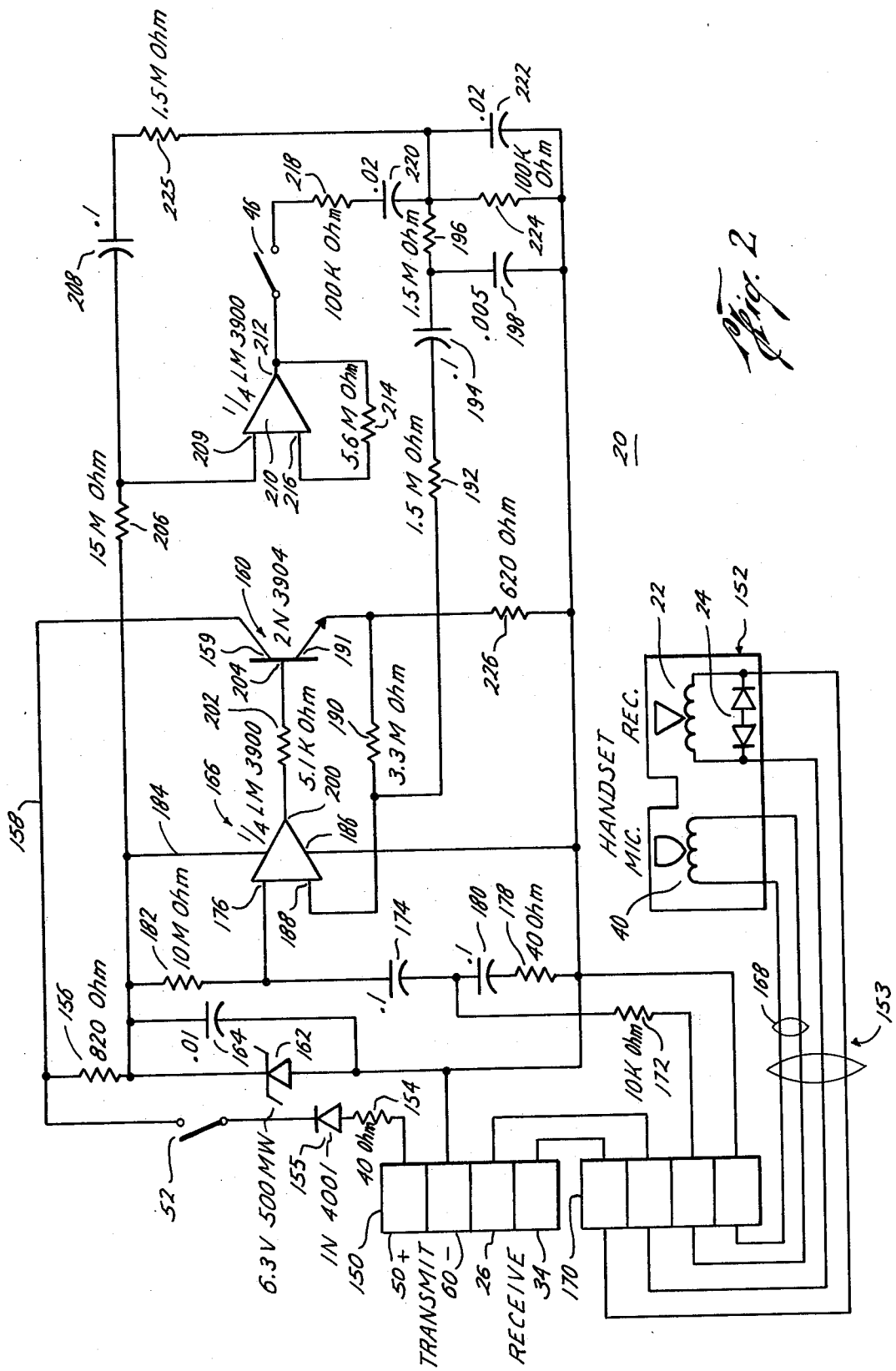
FIG. 2 is a schematic electrical diagram showing a field terminal constructed according to the preferred embodiment of the present invention.

FIG. 2 is a schematic diagram of a preferred embodiment of field terminal 20. Terminal strip 150 connects the conductors 50, 60, 26 and 34 in the two twisted pairs coming from barrier strip 122 to terminal 20. The amplifier 44 is turned on and off by hookswitch 52, which may be a reed switch that is magnetically actuated when handset 152 is picked up by an operator in the field. When switch 52 is closed 24 volt D.C. power flows from the power supply through zener diode 162 and a 40 ohm wire wound resistor 154. This is one of two resistors that acts as a current limiter in the amplifier. It must be wire wound to insure high reliability. A wire wound resistor fails by opening its windings. This insures that any failure of resistor 154 will stop the flow of current to amplifier 20. Current flows through diode 155 which may be a 1N4001, and switch 52 to resistor 156 (which may be an 820 ohm quarter watt carbon composition resistor). The full voltage passing through switch 52 is applied by line 158 to the collector 159 of transistor 160 which may be a 2N3904). The other side of resistor 156 is connected to the positive terminal of zener regulator diode 162 (which may be any zener regulator diode that limits the voltage to 6.3 volts at approximately 500 milliwatts). Zener diode 162 is connected in parallel with a 0.01 m.f.d. capacitor 164. Both zener diode 162 and capacitor 164 are connected in parallel across the power inputs 184 and 186 to operational amplifier 166 (which may be one-quarter of a LM 3900 quad operational amplifier).

Microphone 40 (which is a dynamic microphone), located in handset 152, is connected by a twisted pair 168 to a terminal strip 170. From the terminal strip 170 one side of the dynamic microphone's output winding is connected to output terminal 60 on terminal strip 150. The other side of microphone 40's dynamic winding is connected through resistor 172 (which may be a 10 kilohom one-quarter watt carbon composition resistor) and capacitor 174 (which may be a 0.1 m.f.d. capacitor) to noninverting input 176 of operational amplifier 166. Terminal 60 on terminal strip 150 is also connected to the negative side of capacitor 180 through resistor 178. Resistor 178 is a 40 ohm wire wound resistor and acts as the current limiting resistor on the negative leg of the amplifier's power circuit. This resistor must be wire wound for the same reasons as were discussed in connection with resistor 154 above. Resistor 178 is isolated from resistor 172 by capacitor 180 (which may be a 0.1 m.f.d. capacitor).

Resistor 156 is connected through resistor 182 (which may be a 10 megohm quarter watt carbon composition resistor) to the noninverting input 176 of operational amplifier 166. The positive power terminal 184 (for example pin 14) of operational amplifier 166 is connected in parallel with the positive terminal of zener regulator doide 162 to resistor 156. The negative power input 186 (for example pin 7) of operational amplifier 166 is connected in parallel with the negative side of zener regulator diode 162 to terminal 60 (the negative power supply terminal) on connector strip 150. Inverting input 188 of operational amplifier 166 is connected through resistor 190 (which may be a 3.3 megohm quarter watt carbon composition resistor) to emitter 191 of NPN transistor 160. Input 188 is also connected through resistor 192 (which may be a 1.5 megohm quarter watt carbon composition resistor) and capacitor 194 (which may be a 0.1 m.f.d. capacitor) to resistor 196 (which may be a 1.5 megohm quarter watt carbon composition resistor) and to capacitor 198 (which may be a 0.005 m.f.d. capacitor). The output 200 of operational amplifier 166 is connected through resistor 202 (which may be a 5.1 kilohm resistor) to the base terminal 204 of transistor 160.

The end of resistor 156 that is connected to the positive terminal of zener diode 162 is also connected to resistor 206 (which may be a 15 megohm one quarter watt carbon composition resistor). Resistor 206 is connected at its other end to capacitor 203 (which may be a 0.1 m.f.d. capacitor) and to noninverting input 209 of operational amplifier 210 (which may be another quarter of a LM 3900 operational amplifier). Output 212 of operational amplifier 210 is connected through resistor 214 (which may be a 5.6 megohm quarter watt carbon composition resistor) to the inverting input to 216 of the operational amplifier. Output 212 is also connected through switch 46 (which is a reed switch and may be magnetically actuated by a push button on the field terminal) to resistor 218 (which may be a 100 kilohm carbon composition resistor), capacitor 220 (which is 0.02 m.f.d. capacitor) amd resistor 196. This connection between resistor 196 and capacitor 220 is also connected in parallel to one side of capacitor 222 (which may be a 0.02 m.f.d. capacitor) and resistor 224 (which may be a 100 kilohm quarter watt carbon composition resistor). Capacitor 208 is connected to one end of resistor 225 (which may be a 1.5 megohm carbon composition resistor) and the other end of resistor 225 is connected to the connection between resistor 196 and capacitor 220. As is shown in FIG. 2, capacitor 222, resistor 224 and capacitor 198 are all connected to negative power terminal 60 on terminal strip 150. The emitter of transistor 160 is also connected to negative terminal 60 on terminal strip 150 through resistor 226 (which may be a 620 ohm quarter watt carbon composition resistor).

Microphone 40 and receiver 22 in the handset are connected by a coiled four conductor telephone cable 153 to terminal strip 170. The receiver is connected directly from terminal strip 170 to terminals 26 and 34 on terminal strip 150 and the dynamic microphone 40 is connected as above described.

Functionally, the handset and amplifier described in FIG. 2 operate as follows:

Twenty-four volt D.C. electric power is applied across terminals 50 and 60 of terminal strip 150. When switch 52 is closed the current flowing through the positive leg of the power circuit is limited by resistor 154 and the current flowing through the negative leg is limited by resistor 178. These wire wound 40 ohm resistors are redundant and fail by interrupting the flow of current through the amplifier thus insuring safe operation on failure.

Dropping resistor 156 applies a voltage across zener diode 162. Zener diode 162 acts as a voltage regulator and is connected in parallel with power input 184 and 186 of operational amplifier 166. Capacitor 164 allows the A.C. potential impressed upon the power signal by voice and tone modulation to bypass the zener regulator diode.

Dynamic microphone 40 generates a low level A.C. signal across its output terminals in response to an audio input. One side of the signal carrying pair 168 is directly connected to terminal 60 on terminal strip 150. The other side of the pair is connected through resistor 172 and capacitor 174 to input 176 of operational amplifier 166. Capacitors 174 and 180 isolate the A.C. signal from D.C. potentials in the circuit and resistor 178 limits the output current to terminal 60 on terminal strip 150. Resistor 182 provides a bias voltage at input 176 of operational amplifier 166 that is varied by the A.C. signal from microphone 40.

Operational amplifier 166 is essentially a voltage amplifier and its modulated output is fed through resistor 202 to the gate input 204 of transistor 160. Collector 159 of transistor 160 is connected through diode 155 and switch 52 to positive input power terminal 50. Emitter 191 of transistor 160 is connected to the negative power terminal 60. Diode 155 and resistor 226 are connected in series circuit with the transistor and with the positive and negative power terminals.

Transistor 160, being connected in reverse bias in parallel with the D.C. power input to the amplifier will operate to modulate the power signal when a properly biased control signal is introduced at its gate terminal 204. Operational amplifier 166 receives the input from microphone 140 and provides this proper control signal to gate 204 of transistor 160.

Thus, an operator speaking into microphone 40 generates a weak A.C. electrical signal that is amplified by operational amplifier 166. The output of operational amplifier 166 is the input that controls the flow of power through transistor 160 and the speech signal thereby modulates the power circuit of the amplifier.

Operational amplifier 210 is configured as an oscillator to act as a tone generator. The noninverting input 209 of operational amplifier 210 is connected to positive power terminal 50 through resistor 156 and resistor 206 in series circuit. Output 212 of operational amplifier 210 is connected through switch 46 and an R.C. network composed of resistors 218, 224, 225 and capacitors 220, 208, 222 and 298 to the negative power terminal 60 of terminal strip 150. Thus when switch 46 is closed, the signal appearing at output 212 of amplifier 210 is fed back to the amplifier's input 209 through the R.C. network above described. If the values of the component are correctly selected, the amplifier will go into oscillation and its frequency can be controlled by changing the value of the R.C. network's components. Specifically, in this embodiment of the invention, the value of resistor 224 can be varied to change the output frequency of the oscillator. The known frequency output of the tone generator is coupled through capacitor 194 and resistor 192 to the inverting input 188 of operational amplifier 166 and through resistor 190 to the emitter 191 of transistor 160. This allows the tone generated by operational amplifier 210 to modulate the D.C. voltage supplied across terminals 50 and 60 of terminal strip 150, as was described above in connection with the modulation of the power signal by the output of microphone 40.

Receiver 22 is directly driven by an AC signal across terminals 26 and 34 of terminal strip 150. A varistor 24 connected in parallel across the receiver circuit acts as a noise limiter. The output of microphone 40 and of tone generator 48 drives preamplifier 166 and amplifier 160 to modulate the D.C. voltage (which is approximately 24 volts) across terminals 50 and 60 of terminal strip 150.

Referring again to FIG. 1, terminals 50 and 60 are connected via a twisted pair and zener barriers to the primary windings 84 and 88 of isolation transformer 90. The secondary 104 of transformer 90 is connected to driver amplifier 82 and tone decoder 108. The DC voltage is isolated by the isolation transformer and the AC signal component is input to driver amplifier 82. Amplifier 82 boosts the power level of the voice signal and renders it compatible with either a paging system or a telephonic communications circuit. The tone decoder detects the presence of a control tone and upon such detection energizes a relay to switch the driver amplifier's output selectably between a paging system and telephone line. The embodiment of the invention illustrated in FIG. 2 shows only one tone generator whose output is used to switch between a paging system and a telephone party line. The invention may use a plurality of different frequency tones, either separately or in combination, to control a plurality of tone decoders and any desired control equipment.

Figure 3:
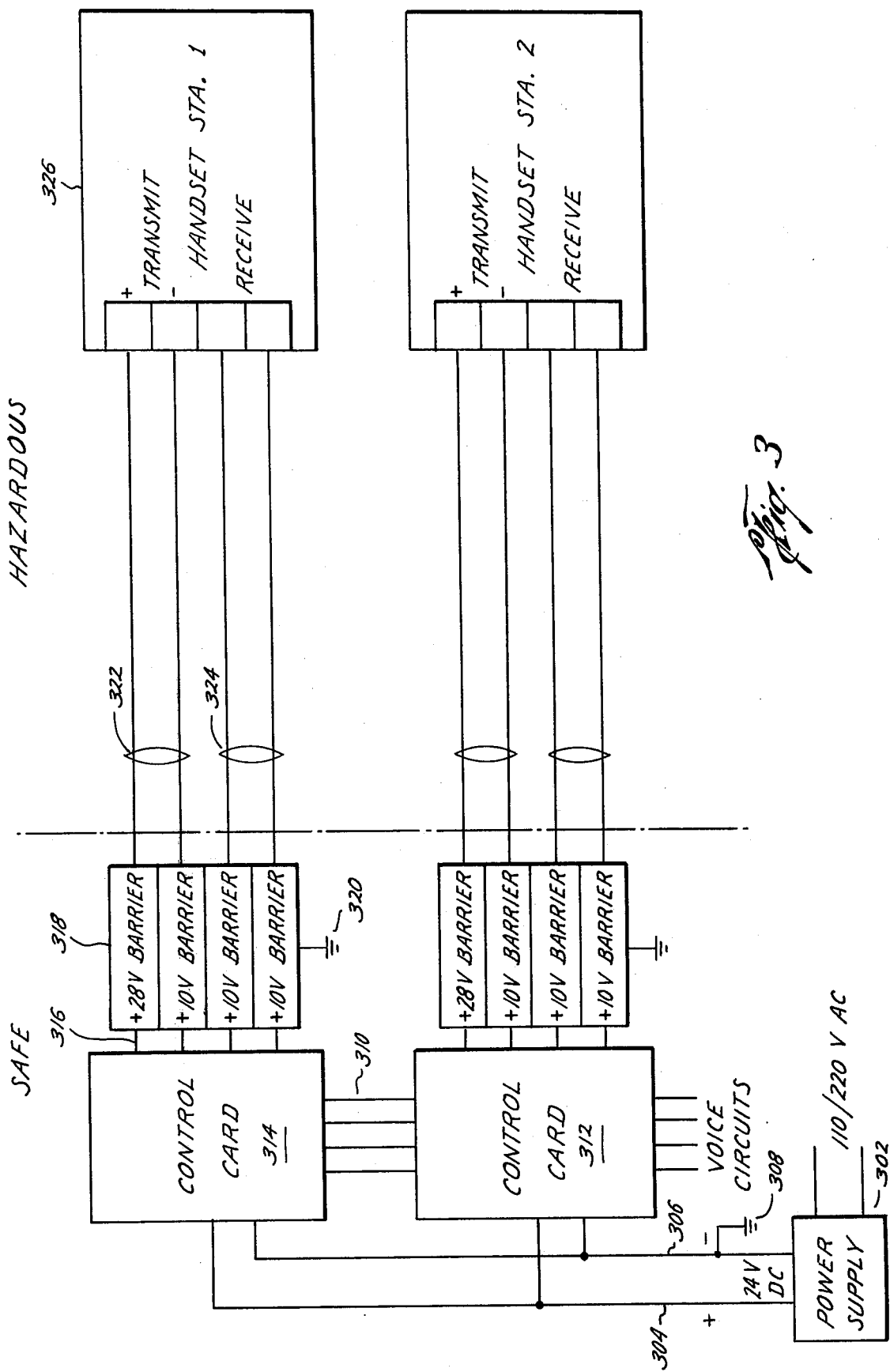
FIG. 3 is a block diagram showing the major elements of the invention.

FIG. 3 shows a block diagram of the major elements of a communication system constructed according to the preferred embodiment of the present invention. A power supply 302 is connected to any convenient source of electric power, (here shown as a 110 or 220 volt AC supply) and converts this input powr to 24 volt DC output on lines 304 and 306. For compatibility with the circuits shown in FIGS. 1 and 2 the negative side of this power supply is grounded at 308. A plurality of telephonic voice circuits 310 also are connected to the control cards 312 and 314. Control card 314 is functionally similar to control card 84 shown in FIG. 1 and contains the necessary current sensor, tone decoder, driver amplifier, isolation transformer, and relays to selectably connect the voice circuits to the barrier strips and hand sets. The control card is electrically connected by lines 316 to a plurality of zener barriers 318. These barriers function as described in connection with FIG. 1 limit the voltage that can appear across their output terminals regardless of the voltage present at their input terminals. The zener diodes are securely and redundantly grounded at ground 320. The power supply, control cards, and barrier strips all operate in a safe environment. By safe environment it is meant an environment where high power levels, sparks, and high voltages will not cause danger. The output of the barriers are limited in voltage by the zener diodes and in current by the current limiting resistors in the hand set amplifiers. Thus, the total power that can appear across the output of the zener barriers is limited. Handset 326 and twisted pairs 322 and 324 may all be operated in perfect safety in a hazardous environment. Hazardous environment, for the purpose of this invention is defined by Article 500 of the National Electrical Code. Although different classes and groups are used to define various types and degrees of hazardous environment such environments generally require that electrical and electronic equipment must be operated at extremely low power levels or inside explosion proof casings to be safe.

The combination of zener barriers and current limiting resistors provides a method of insuring that power levels in the hazardous areas never become dangerous. Modulation by the handset amplifier of the D.C. voltage supply provides a means of transmitting high signal levels for long distances on low amounts of power.

Any number of telephone handsets can be connected through zener barriers to control cards as shown in FIG. 3. This redundant parallel operation provides a high measure of reliability that is especially desirable in emergency situations when part of the communication system may be physically damaged. Each handset has the capacity to transmit telephonic voice communications and a plurality of control signals over a single twisted pair. Individual handsets may be interconnected by tone controlled switching equipment that would be compatable with standard telephone switching circuits. This mode of operation would require the use of additional, but well known, switching electronics. Handsets could also be automatically connected to any of several useful devices, i.e. paging system or a radio communication system. It is possible to isolate the 110 volt power supply shown in FIG. 3 from the system through an uninterruptable power supply. This is commonly done with computing equipment and would allow continuous operation of the communication and control system even in the event of a power failure.

FIG. 4 shows the external appearance of the amplifier housing and handset used in the preferred embodiment of the invention. The amplifier housing 402 is roughly rectangular and is mounted on a wall or other supporting surface by driving nails or screwing screws (not shown) through holes 404 in the rear of the cabinet. The cabinet interfaces through adapter 406 to a conduit 408 that is adapted to carry the twisted pairs of wire connecting the field terminal with the zener barrier strip. The front of cabinet 402 is attached by means of screws 410. The entire cabinet may be cast of plastic or formed out of fiber glass. This allows a great savings in weight, expense, time and trouble over the heavy metal explosion proof castings now required to house telephonic communication systems in hazardous environments.

The front of the cabinet is equipped with a switch hood actuator 412 and a spring loaded paging push button 414. Handset 416 (which may be a standard telephone handset housing) is connected by a cnvenient length of coiled cable 418 through grommet 420 in the front surface of housing 402 to the electronics within the housing. The cabinet and conduit may be of any desired design and made of any material having sufficient strength to support the electronics and contain the interconnecting wire. High strength is not required is because all the electronics and wiring in the amplifier and the handset operate on power levels that are so low that they are intrinsically safe under all operating conditions.

FIG. 5 shows a partial cut away view of the interior of amplifier housing 42. The electronics of amplifier 424 are mounted on a printed circuit board 426 that is affixed to the interior of cabinet 402 by screws 428. Magnetic reed switches 52 and 46 are actuated by the relative proximity of magnets 430 and 432, respectively. The position of these magnets with respect the magnetically controlled reed switches they control are determined by the positions of switch hook 412 and spring loaded push button 414. When switch hook 412 is depressed, magnet 430 moves into closer proximity to reed switch 52 and causes the reed switch to open. When push button 414 is depressed, it moves magnet 432 into closer proximity to read switch 46 and causes the reed switch to close. Both of these actuators are spring loaded so that their associated magnets normally are at a distance from the magnetic read switches that will not cause the reed switches to change position. Any convenient number of additional reed switches may be mounted on the amplifier printed circuit board and actuated by analogous means.

The handset amplifier is completely encapsulated in the epoxy resin to a level shown by line 434. This renders the electronic components relatively insensitive to shock and vibration and also insures that foreign material entering housing 402 cannot cause short circuits or electrical malfunctions in the amplifier. As the reed switches are magnetically controlled, there is no need for a physical connection between the switching equipment within the amplifier and the actuators that cause the switches to operate.

I claim:

1. A method of accomplishing intrinsically safe communications comprising:
    establishing a flow of current in a circuit between a power supply located in a safe area and a amplifier located in a hazardous area;
    limiting the amount of power that can be available in the portion of the circuit located in the hazardous area to below 625 milliwatts at less than 25 volts;
    generating telephonic communication signals at intrinsically safe power levels in said hazardous area in response to audio frequency acoustic compression waves;
    modulating the flow of current through said amplifier in response to said telephonic communication signals;
    demodulating said telephonic communication signals from said flow of current in the safe area; and
    amplifying said demodulated signals in said safe area.

2. A communications device for communicating between a hazardous area and a safe area comprising:
    an amplifier located in the hazardous area;
    a power supply and demodulator located in the safe area;
    power limiting means located between and electrically connected to said amplifier and said power supply and demodulator for providing a flow of current between said amplifier and said demodulator while limiting the flow of current in said hazardous area to an intrinsically safe level;
    a dynamic microphone in said hazardous area capable of generating intrinsically safe telephonic output signals in response to audio frequency acoustic compression waves, said microphone being electrically connnected to said amplifier so the microphone's telephonic output signals modulate the current passing through the amplifier; and
    a second amplifier responsive to said demodulator in said safe area that amplifies the signal to provide an amplified audio frequency output demodulated signal.

3. A device as in claim 2 wherein,
    said power limiting means comprises a zener barrier and a current limiting resistor connected so as to limit the electric power available in the hazardous area to below 625 milliwatts at less than 25 volts.

4. A communications device as per claim 2 including control signal generating means located in said hazardous area for generating a control signal, adapted to be part of said telephonic output signals, and control signal sensing means located in said safe area responsive to said demodulating means for detecting the presence of said control signal and adapted to generated an output whereby a control function may be performed.

5. A communications device as per claim 4 wherein said control signal generating means is a tone generator operating at a known frequency, said control signal sensing means is a tone decoder responsive to said frequency, and said control function is the switching of a relay.

6. A communications device as per claim 2 and including, means for modulating a second power limited circuit to communicate an information carrying signal from said safe area to a receiver in said hazardous area portion.

* * * * *